No. 698,849. Patented Apr. 29, 1902.
C. OUELLETTE.
SCRAPER FOR FLOORS, &c.
(Application filed Sept. 16, 1901.)
(No Model.) 2 Sheets—Sheet 2.
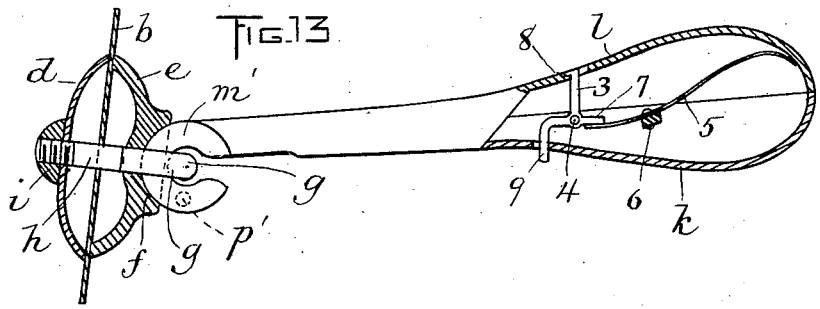
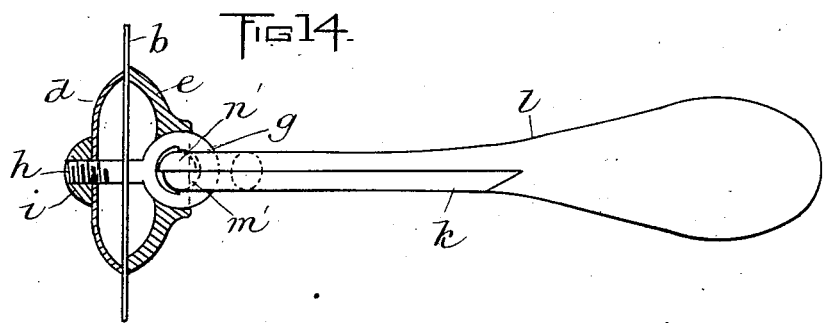
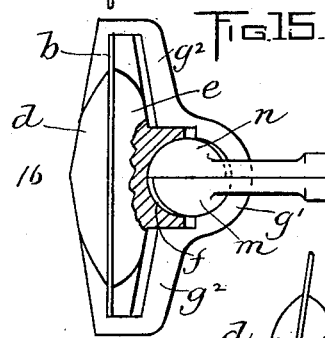
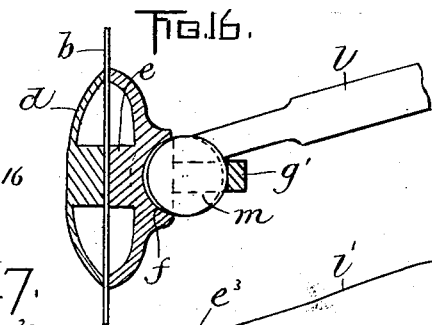
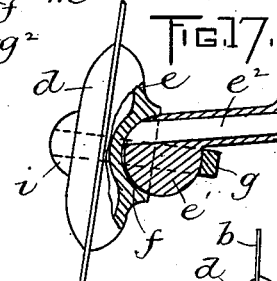
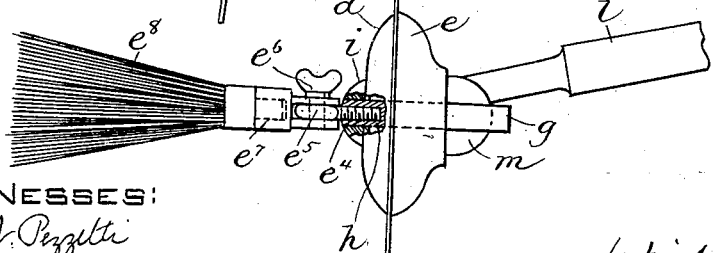
WITNESSES:
P. W. Pezzetti
George Pezzetti
INVENTOR:
Clovis Ouellette
by Wright Brown & Quimby
Attys

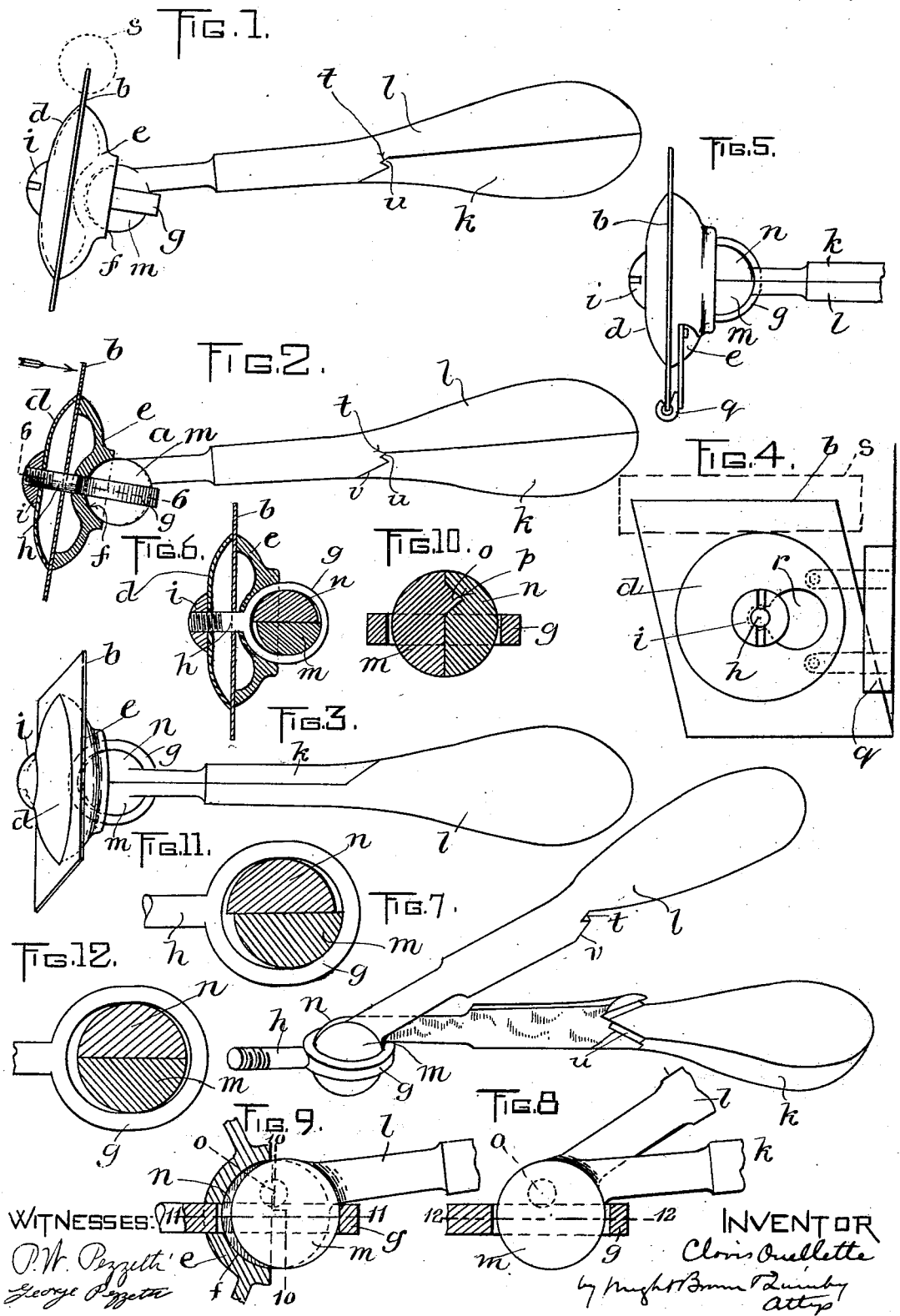

UNITED STATES PATENT OFFICE.

CLOVIS OUELLETTE, OF LOWELL, MASSACHUSETTS.

SCRAPER FOR FLOORS, &c.

SPECIFICATION forming part of Letters Patent No. 698,849, dated April 29, 1902.

Application filed September 16, 1901. Serial No. 75,510. (No model.)

*To all whom it may concern:*

Be it known that I, CLOVIS OUELLETTE, of Lowell, in the county of Middlesex and State of Massachusetts, have invented certain new and useful Improvements in Scrapers for Floors, &c., of which the following is a specification.

This invention relates chiefly to tools for smoothing wood surfaces that require a high polish, such as cabinet-work and interior house finish, and is especially adapted to tools for use in smoothing hard-wood floors and for scraping paint, varnish, &c., from floors and other surfaces.

The invention has for its object to provide a simple and efficient tool comprising a working member, such as a scraping-blade and a handle therefor, the blade being adapted to be readily adjusted relatively to the handle to suit various requirements.

The invention consists in the improvements which I will now proceed to describe and claim.

Of the accompanying drawings, forming a part of this specification, Figure 1 represents a side elevation of my improved scraper in position for use upon a floor or other surface. Fig. 2 represents an elevation similar to Fig. 1 with the scraper and holder in section. Fig. 3 represents a top view. Fig. 4 represents an end elevation. Fig. 5 represents a top view showing a guard hereinafter described. Fig. 6 represents a section on line 6 6 of Fig. 2. Fig. 7 represents a perspective view of part of the handle and clamp-adjusting bolt in position to release the clamp. Fig. 8 represents an elevation, partly in section, of parts shown in Fig. 7. Fig. 9 represents a view similar to Fig. 8, showing a different adjustment. Fig. 10 represents a section on line 10 10 of Fig. 9. Fig. 11 represents a section on line 11 11 of Fig. 9. Fig. 12 represents a section on line 12 12 of Fig. 8. Fig. 13 is a side elevation, partly in section, of a modified form of scraper. Fig. 14 is a top view of the same, also partly in section. Fig. 15 is a top view of another modification. Fig. 16 is a section on line 16 16, Fig. 15. Fig. 17 is a sectional elevation of another form of holding device. Fig. 18 shows the means provided for attaching a brush or broom to the scraper.

Referring first to Figs. 1 to 12, inclusive, $b$ represents the blade of my improved scraper, which is interposed between two clamp members $d$ $e$. The inner member $e$ is provided with a recess $f$, which forms one part of an adjustable two-part socket.

$g$ represents a loop formed on the inner end of a bolt $h$, which passes through the members $e$ and $d$ and blade $b$, the outer end of the bolt being screw-threaded to engage a nut $i$, which constitutes a head engaging the outer clamp member $d$. Said loop forms the complemental part of said adjustable two-part socket.

The scraper is provided with a handle, which is composed of two parts or members $k$ $l$. Said members are provided at their inner ends with bosses $m$ $n$, which in this embodiment of my invention are substantially hemispherical. One of said bosses is provided upon its inner surface with a conical projection $o$, Figs. 8, 9, and 10, adapted to engage a complemental socket $p$, formed in the other boss, as shown in Fig. 10.

The projection $o$ and socket $p$ are eccentrically arranged, so that when the handle members $l$ $k$ are placed together and in the position shown in Figs. 7 and 8 the two bosses are contracted or become substantially spherical and are adapted in this position to be introduced into and turned freely in the loop $g$. The bolt $h$ is then passed through the clamp members and blade and engaged by the nut or head $i$, as shown in Fig. 2, the bosses $m$ and $n$ being interposed between the loop $g$ and recess $f$.

The members $l$ and $k$ of the handle constitute independently-movable levers, of which the projection $o$ and socket $p$ constitute the fulcrum, so that when the members are closed to form the handle, as shown in Figs. 1 to 6, the boss $n$ bears against the recess $f$ and the boss $m$ bears against the inner periphery of loop, so that the clamp members are firmly drawn inwardly and caused to firmly engage and hold the blade.

The loop $g$ is formed slightly oblong, so that the boss $n$ may be free to bear against the recess $f$ without engaging the inner surface of the loop, as shown in Fig. 9.

The scraping-blade is preferably rhomboidal in form, so that in operating on a floor near a base-board an acute angle of the blade may enter the right angle formed by the floor and base-board.

In Figs. 4 and 5 I have shown a guard $q$, suitably secured to the clamp member $e$, so that when operating near the base-board the guard will prevent contact between the blade and the base-board.

The clamp member $d$ of the head is adapted to be readily detached without loosening the head or nut $i$ on the bolt $h$, said member being provided with a keyhole-shaped opening $r$, the larger end of which is slightly larger in diameter than the nut $i$, so that when the members of the handle are in the open position shown in Figs. 7 and 8 and the member $d$ is released from pressure said member may be moved laterally until the opening $r$ registers with the nut $i$.

When the device is to be operated with both hands, a "handhold" $s$ (shown in dotted lines in Figs. 1 and 4) may be applied to the upper edge of the blade. Said handhold may consist of a piece of wood or other suitable material grooved upon one side to engage the blade. This handhold protects the edge of the blade on which it is mounted and prevents said edge from being dulled.

The handle members $l$ and $k$ may be held together when in operation by any suitable means. I have shown formed upon the member $l$ a notch $t$, with which is adapted to engage a tooth or projection $u$, formed on the member $k$. An incline $v$, Fig. 7, is provided upon the member $l$, the arrangement being such that when the two members are pressed together the incline $v$ will engage the projection $u$ and enable the parts $t\,u$ to interlock, as shown in Fig. 1, the pressure on the clamping parts holding the said parts in engagement.

It will be seen that the bosses $m\,n$ formed on the handle members and eccentrically pivoted together constitute an adjustable filling-piece interposed between the loop $g$ and recess $f$, said filling-piece being extended by the adjustment of the handle members to the position shown in Figs. 1, 2, 9, and 11, and thus caused to extend the two-part socket and close the clamp members upon the blade, and contracted by the adjustment of the handle members to the position shown in Figs. 7, 8, and 12, thus permitting the contraction of the socket and releasing the clamp members. When the clamp members are released, the blade $b$ may be rotated on the bolt $h$ to bring either edge of the blade into working position, and the clamp members and blade may be turned in various directions on the contracted filling-piece to vary the angle of the blade relatively to the handle, so that the lower edge may extend diagonally to the handle or at a right angle therewith, and the blade may be inclined vertically with relation to the handle or may stand at a right angle therewith. Either of the four edges of the blade may therefore be used, the blade being turned after one edge has become dull to bring another edge into position for use. The clamp is released and engaged simply by spreading and closing the parts of the handle. Hence the blade can be very quickly released, adjusted, and secured. The blade and handle can be very quickly separated and packed in small compass when not in use, or they may be folded into relatively compact form without separation. The blade and handle can be adjusted so that the tool may be operated either by drawing it toward or moving it from the operator.

In Figs. 13 and 14 I have shown a modification in which the adjustable filling-piece is composed of bosses $m'\,n'$, which are substantially annular or hook-shaped instead of hemispherical and are eccentrically connected at $p'$, so that they are adapted to engage and release the two-part socket substantially in the manner above described. I have also shown in Fig. 13 modified means for locking the handle members $l\,k$ in closed position, the same comprising a latch 3, pivoted at 4 to the handle member $k$. A spring 5, secured to a lug 6, pivoted to the handle member $k$, bears at one end upon an arm 7, formed upon the latch, and at the other end upon the handle member $l$, so that when the two handle members are brought together, as shown, the latch engages a notch 8 formed in the member $l$ and locks the handle members together. The latch is provided with an arm 9, which projects downwardly through a slot in the member $k$ and enables the latch to be detached from the member $l$ when the handle members are to be separated.

Figs. 15 and 16 show the outer part of the socket formed as a loop $g'$, connected by arms $g^2\,g^2$ with the end portions of the clamping member $d$, the handle and filling-piece being constructed as shown in Figs. 1 to 12.

In Fig. 17 the two-part socket is substantially the same as shown in Figs. 1 to 12, the filling-piece being of different construction and comprising a ball $e'$, engaging the recess $f$ and loop $g$. Said ball is formed upon the handle member $l'$, which member is provided with a plunger $e^2$, the inner end of which is adapted to bear on the recess $f$ and the outer end to bear against a projection $e^3$, formed on the handle member $k'$. Said member $k'$ is pivoted at $e^4$ to the member $l'$, the arrangement being such that when the members $k'\,l'$ are closed the projection $e^3$ on the member $k'$ will engage the end of the plunger and force the latter against the recess $f$. The said plunger and the ball $e'$ therefore constitute an adjustable filling-piece which engages and releases the two-part socket.

For convenience in cleaning dirt and dust from the surfaces to be operated upon I have shown in Fig. 18 means for holding a brush. The outer end of the bolt $h$ is drilled and tapped to receive a screw $e^4$, having an eye $e^5$ upon its outer end adapted to receive a thumb-screw $e^6$, which screw passes through ears upon a head $e^7$, to which a brush $e^8$ is suitably attached.

It is obvious that the clamping members, the handle, and the socket and filling-piece connections between the clamping members and the handle may be used in connection with any suitable working member which is capable of being clamped between said clamping members. I do not, therefore, limit myself to a scraping-blade as the said working member nor to the particular form of the acting faces of the clamping members here shown, as said acting faces may be adapted to the form of the working member to be clamped.

I claim—

1. A tool of the character stated comprising a working member, clamping members formed to confine the said working member, a handle, and connections between the clamping members and the handle, said connections including a socket and a filling-piece therefor, and having provisions for rigidly securing the clamping members and the blade to the handle at various angles.

2. A tool of the character stated comprising a working member, clamping members formed to confine the said working member, an expansible socket connected with the clamping members and adapted when expanded to lock the clamping members and working member together, and a handle having an expansible socket-filling piece on which the socket is adapted to turn to give the working members various angular adjustments, and means for expanding said filling-piece and socket.

3. A tool of the character stated comprising a working member, such as a blade, outer and inner clamping members bearing on opposite sides of the blade, a two-part adjustable socket, one part of which is attached to one clamping member while the other part is attached to the other clamping member, a handle having a two-part adjustable filling-piece located between said socket parts, and means for extending said filling-piece to cause it to elongate the two-part socket and thereby cause the clamp members to grasp the blade.

4. A tool of the character stated comprising a working member, such as a blade, outer and inner clamping members bearing on opposite sides of the blade, a two-part adjustable socket, one part of which is attached to one clamping member, while the other part is attached to the other clamping member, a handle having a two-part adjustable filling-piece located between said socket parts, and means for extending said filling-piece to cause it to elongate the two-part socket and thereby cause the clamp members to grasp the blade, the said socket and filling-piece being formed to permit a rotative adjustment of the socket-piece and clamp members relatively to each other, whereby the clamp members and the blade held thereby may be secured to the handle at different angles.

5. A tool of the character stated comprising an acting member, such as a blade, outer and inner clamping members bearing on opposite sides of the blade, a two-part adjustable socket, one part of which is attached to one clamping member while the other part is attached to the other clamping member, a handle composed of two independently-movable members terminating in a two-part adjustable filling-piece located between said socket parts and eccentrically connected, so that the filling-piece may be elongated by a given adjustment of the handle members and caused to engage the clamping members with the blade.

6. A tool of the character stated, comprising a working member, such as a blade, outer and inner clamping members bearing on opposite sides of the blade, a two-part adjustable socket, one part of which is attached to one clamping member while the other part is attached to the other clamping member, a handle having a two-part adjustable filling-piece located between said socket parts, and means for extending said filling-piece to cause it to elongate the two-part socket and thereby cause the clamp members to grasp the blade, said blade being rotatably adjustable between the clamping members to present either of its edges to the surface to be scraped.

7. A tool of the character stated, comprising a working member, such as a blade, outer and inner clamping members bearing on opposite sides of the blade, a two-part adjustable socket, one part of which is attached to one clamping member, while the other part is attached to the other clamping member, a handle having a two-part adjustable filling-piece located between said socket parts, and means for extending said filling-piece to cause it to elongate the two-part socket and thereby cause the clamp members to grasp the blade, one of said clamping members having a guard formed to project over one edge of the blade.

8. A tool of the character stated, comprising a working member, such as a blade, outer and inner clamping members bearing on opposite sides of the blade, a two-part adjustable socket, one part of which is attached to one clamping member, while the other part is attached to the other clamping member, a handle having a two-part adjustable filling-piece located between said socket parts, and means for extending said filling-piece to cause it to elongate the two-part socket and thereby cause the clamp members to grasp the blade, said blade having a handhold adapted to detachably engage one of its edges.

9. A tool of the character stated, comprising an acting member, such as a blade, outer and inner clamping members bearing on opposite sides of the blade, a two-part adjustable socket, one part of which is attached to one clamping member while the other part is attached to the other clamping member, a handle composed of two independently-movable members terminating in a two-part adjustable filling-piece located between said socket parts and eccentrically connected, so that the filling-piece may be elongated by a given adjustment of the handle members and caused to engage the clamping members with the blade, and means for locking the handle members together to maintain the filling-piece in its elongated adjustment.

10. A tool of the character stated, comprising an acting member, such as a blade, outer and inner clamping members bearing on opposite sides of the blade, a two-part adjustable socket, one part of which is attached to one clamping member, while the other part is attached to the other clamping member, a handle composed of two independently-movable members terminating in a two-part adjustable filling-piece located between said socket parts and eccentrically connected, so that the filling-piece may be elongated by a given adjustment of the handle members and caused to engage the clamping members with the blade, one member of the handle having a projection and the other member a recess adapted to engage said projection to lock the handle members together.

11. A tool of the character stated, comprising a blade, outer and inner clamping members bearing on opposite sides of the blade, the inner member having a member of a two-part socket, a loop attached to the other clamping member and forming a complemental part of said two-part socket, a handle composed of two independently-movable members terminating in bosses located in said loop and eccentrically connected, said bosses projecting into the said socket and forming an adjustable filling-piece between the parts of the socket, said filling-piece being elongated by a given adjustment of the handle members, and caused to engage the clamp members with the blade.

12. A tool of the character stated, comprising a blade, outer and inner clamping members bearing on opposite sides of the blade, the inner member having a member of a two-part adjustable socket, a bolt passing through said members and blade and engaged at one end with the outer member and having at the other end a loop forming a complemental part of said two-part socket, a handle composed of two independently-movable members terminating in bosses located in said loop and eccentrically connected, said bosses projecting into the said socket and forming an adjustable filling-piece between the parts of the socket, said filling-piece being elongated by a given adjustment of the handle members and caused to engage the clamp members with the blade.

13. A tool of the character stated, comprising a working member, such as a blade, outer and inner clamping members bearing on opposite sides of the blade, a two-part adjustable socket, one part of which is attached to one clamping member, while the other part is attached to the other clamping member, a handle having a two-part adjustable filling-piece located between said socket parts, and means for extending said filling-piece to cause it to elongate the two-part socket and thereby cause the clamp members to grasp the blade, the said tool having means for holding a brush.

In testimony whereof I have affixed my signature in presence of two witnesses.

CLOVIS OUELLETTE.

Witnesses:
OVIDE OUELLETTE,
J. T. MASTERSON.